US010267283B2

(12) United States Patent
Yasukawa et al.

(10) Patent No.: US 10,267,283 B2
(45) Date of Patent: Apr. 23, 2019

(54) SOLENOID VALVE

(71) Applicant: HITACHI AUTOMOTIVE SYSTEMS, LTD., Ibaraki (JP)

(72) Inventors: Yoshihito Yasukawa, Tokyo (JP); Akiyasu Miyamoto, Tokyo (JP); Takao Miyake, Hitachinaka (JP); Takatoshi Iizuka, Hitachinaka (JP); Masashi Sugaya, Hitachinaka (JP); Kiyotaka Ogura, Hitachinaka (JP); Motoyuki Abe, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/579,682

(22) PCT Filed: Jun. 17, 2016

(86) PCT No.: PCT/JP2016/068026
§ 371 (c)(1),
(2) Date: Dec. 5, 2017

(87) PCT Pub. No.: WO2017/002638
PCT Pub. Date: Jan. 5, 2017

(65) Prior Publication Data
US 2018/0163685 A1      Jun. 14, 2018

(30) Foreign Application Priority Data

Jun. 29, 2015 (JP) .................................. 2015-129463

(51) Int. Cl.
*F16K 27/02* (2006.01)
*F02M 63/00* (2006.01)
(Continued)

(52) U.S. Cl.
CPC ...... *F02M 63/0075* (2013.01); *F02M 47/027* (2013.01); *F02M 51/06* (2013.01);
(Continued)

(58) Field of Classification Search
CPC .. F16K 31/06; F16K 31/0675; F16K 31/0689; F16K 27/029; F02M 51/06;
(Continued)

(56) References Cited

U.S. PATENT DOCUMENTS 6,062,531 A * 5/2000 Rapp .................... F02M 47/027
239/533.8
6,161,813 A * 12/2000 Baumgartner ....... F02M 47/027
251/129.16
(Continued)

FOREIGN PATENT DOCUMENTS

JP          6-4367 U      1/1994
JP     2011-137442 A      7/2011
(Continued)

OTHER PUBLICATIONS

International Search Report for WO 2017/002638 A1, dated Oct. 11, 2016.

*Primary Examiner* — Matthew W Jellett
(74) *Attorney, Agent, or Firm* — Volpe and Koenig, P.C.

(57) ABSTRACT

A solenoid valve provided with a valve element that abuts against and separates from a valve seat to seal fuel; a movable iron core capable of being separated from the valve element; and a fixed iron core arranged opposed to the movable iron core. The solenoid valve also includes: a first spring member that energizes the valve element toward a side of the valve seat; a second spring member that energizes the movable iron core toward the fixed iron core; and a stopper part disposed on the side of the valve seat with respect to the movable iron core, and arranged with the
(Continued)

movable iron core via a gap in a displacement direction in a valve closed state. The gap is set so the movable iron core collides with the stopper part when being displaced in the valve closing direction after the valve element is opened.

10 Claims, 5 Drawing Sheets

(51) Int. Cl.
    *F16K 31/06*     (2006.01)
    *F02M 51/06*     (2006.01)
    *F02M 47/02*     (2006.01)
    *H01F 3/00*     (2006.01)

(52) U.S. Cl.
    CPC .... *F02M 51/0675* (2013.01); *F02M 63/0017* (2013.01); *F16K 27/029* (2013.01); *F16K 31/06* (2013.01); *F16K 31/0675* (2013.01); *F16K 31/0689* (2013.01); *H01F 3/00* (2013.01)

(58) Field of Classification Search
    CPC ............ F02M 51/0675; F02M 47/027; F02M 63/0017; F02M 63/0075; F02M 63/0022; H01F 3/00
    See application file for complete search history.

(56) References Cited

U.S. PATENT DOCUMENTS

| | | | |
|---|---|---|---|
| 8,104,698 B2 * | 1/2012 | Hayatani | F02M 51/0671 239/533.14 |
| 2009/0159729 A1 * | 6/2009 | Yoshimaru | F02M 51/0682 239/585.1 |
| 2012/0067982 A1 * | 3/2012 | Perry | F02M 51/0685 239/585.3 |
| 2012/0080542 A1 * | 4/2012 | Imai | F02M 51/0671 239/533.2 |

FOREIGN PATENT DOCUMENTS

| | | |
|---|---|---|
| JP | 2012-097728 A | 5/2012 |
| JP | 2013-064414 A | 4/2013 |
| JP | 2013-104340 A | 5/2013 |

* cited by examiner

SOLENOID VALVE

TECHNICAL FIELD

The present invention relates to a solenoid valve that is used in an internal combustion engine and mainly injects fuel.

BACKGROUND ART

As a background technology in this technical field, there is JP 2012-97728A (PTL 1). In this publication, a fuel injection nozzle is provided with a movable stopper that slides with both a movable iron core and a valve element, and forms a gap between the movable iron core and the valve element in a displacement direction in a valve closed state. This causes the movable iron core to collide with the valve element when the valve is opened, which enables reduction of a moving time for a distance required to open the injection hole, and allows relative motion between the movable iron core and a valve after opening and closing of the valve, improving controllability of an injection amount.

CITATION LIST

Patent Literature

PTL 1: JP 2012-97728A

SUMMARY OF INVENTION

Technical Problem

In a fuel injection device, it is required to promote spray atomization and to stabilize an injection amount. A degradation factor of spray atomization is that a fuel flow rate becomes slow in a low lift period at the beginning of opening of a valve element. A degradation factor of injection amount stabilization is that convergence of a valve operation is slow after valve opening. Therefore, it is necessary for the fuel injection device to quickly converge the operation of the valve element after valve opening, while making a start of the opening sharp. In PTL 1, by providing a gap in the displacement direction between the movable iron core and the valve element, only the movable iron core is operated before a start of energization, an impact force at the time of a collision is applied to the valve element upon valve opening, and a low lift engine is shortened. Further, by providing a stopper between the valve elements of the movable iron core, the valve element and the movable iron core can relatively move, enabling stabilization of an injection amount.

However, a movable element continues to be displaced downward after valve closing, a speed of the movable element is high in returning to a valve-closed standby state, and a member on an upper part of the valve element is lifted. Accordingly, there has been a problem that, when an injection interval is shortened, the gap in the displacement direction becomes small, and a valve opening behavior is not stabilized.

It is an object of the present invention to make it possible to stably perform a valve opening operation of the valve element even when an injection interval is shortened.

Solution to Problem

In order to achieve the above object, the solenoid valve of the present invention includes: a valve element that abuts against and separates from a valve seat to seal fuel; a movable iron core capable of being separated from the valve element; and a fixed iron core arranged opposed to the movable iron core. The solenoid valve also includes: a first spring member that energizes the valve element toward a side of the valve seat; a second spring member that energizes the movable iron core toward the fixed iron core; and a stopper part disposed on the side of the valve seat with respect to the movable iron core, and arranged with the movable iron core via a gap in a displacement direction in a valve closed state. In the solenoid valve, the gap is set such that the movable iron core collides with the stopper part when being displaced in the valve closing direction after the valve element is opened.

Advantageous Effects of Invention

According to a configuration of the present invention, it is possible to stably perform a valve opening operation of the valve element even when an injection interval is shortened.

BRIEF DESCRIPTION OF DRAWINGS

FIG. 1 is a cross-sectional view showing a structure of a fuel injection device according to a first embodiment of the present invention, and is a longitudinal cross-sectional view showing a cut surface parallel to a center axis 100a.

DESCRIPTION OF EMBODIMENTS

Embodiments of the present invention will be described below.

First Embodiment

Figure 1:
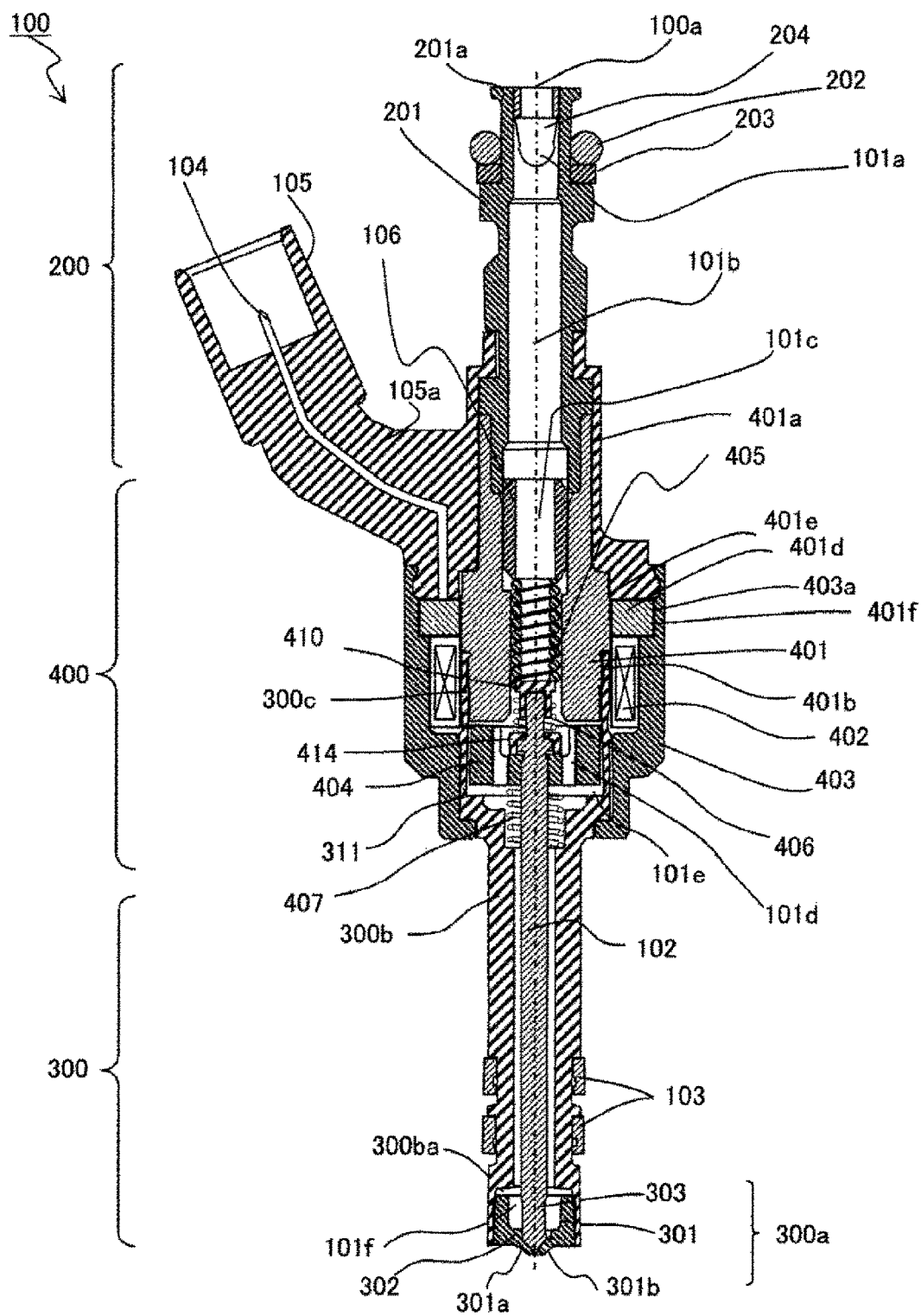
Figure 3:
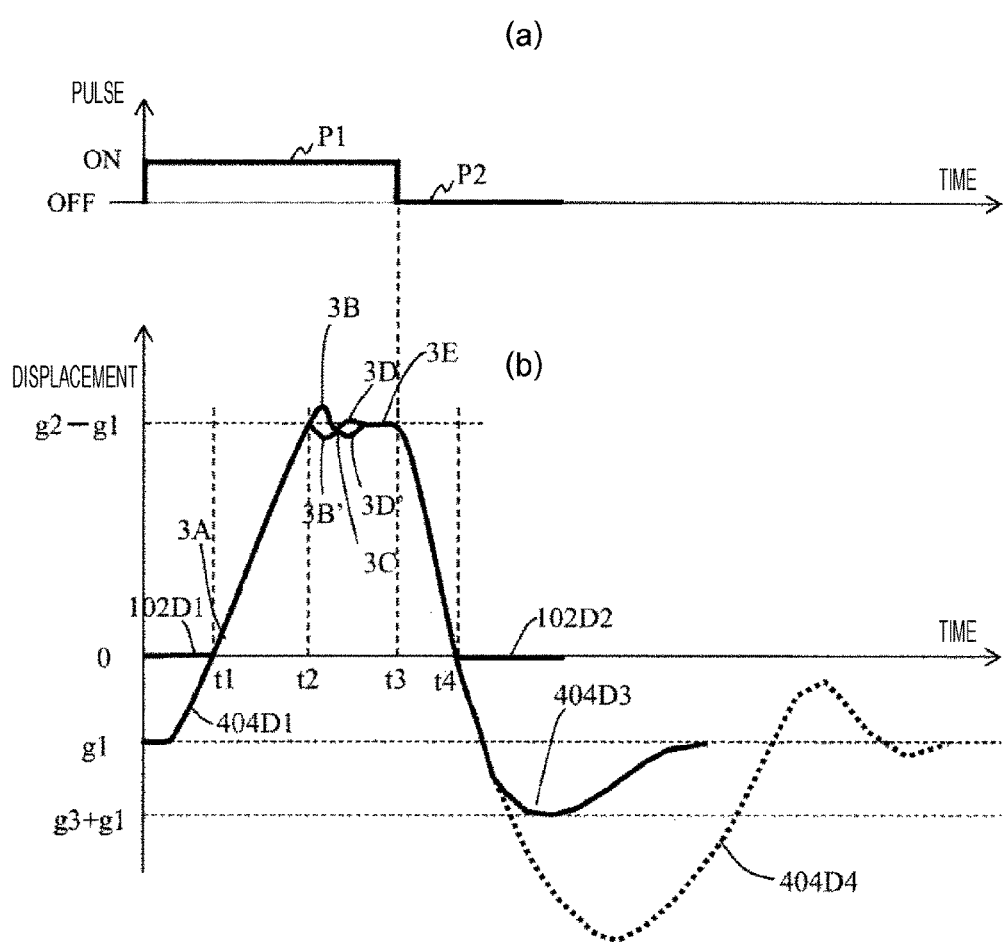
FIG. 3 is a graph describing an operation of a movable portion, corresponding to an injection command pulse in an embodiment of the present invention.
Figure 4:
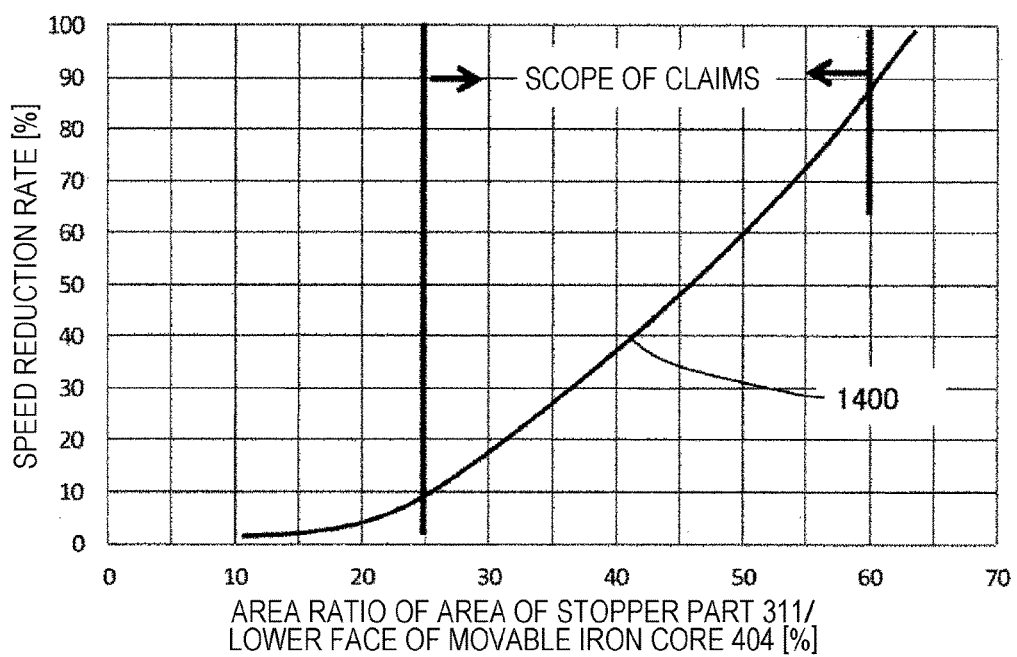
FIG. 4 is a graph showing an effect of the invention according to the first embodiment of the present invention.

With reference to FIGS. 1 and 3, a configuration of a fuel injection device 100 (solenoid valve) as a first embodiment of the present invention will be described. An object of this embodiment is to provide a structure that improves a stability of an operation of a valve element at valve opening and promotes stabilization of an injection amount even when an injection interval is shortened, in a fuel injection device (solenoid valve) in which the valve element receives an impact force from a movable iron core at the valve opening, and the low lift period at the valve opening can be shortened.

Figure 2:
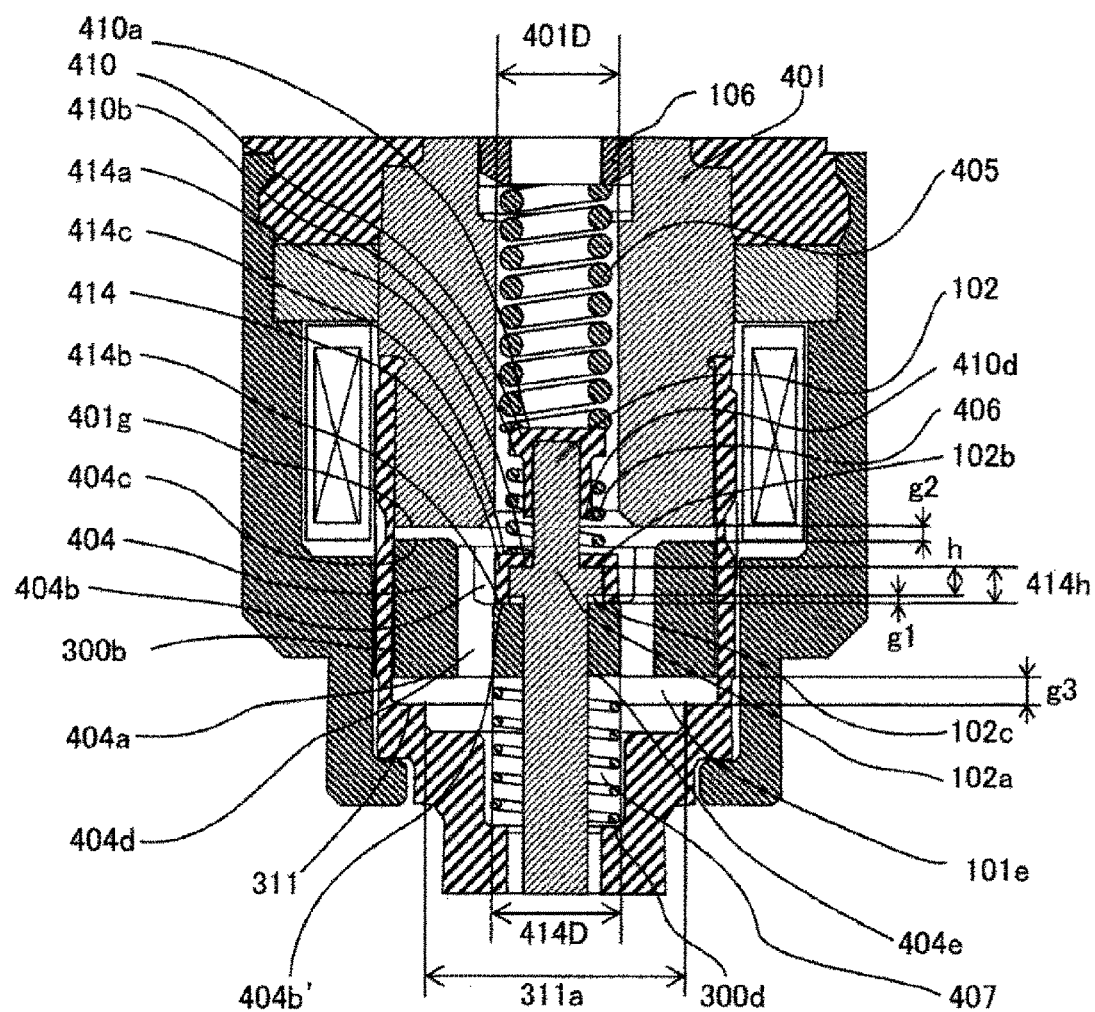
FIG. 2 is an enlarged cross-sectional view of an electromagnetic drive part of the fuel injection device shown in FIG. 1.

FIG. 1 is a cross-sectional view showing a structure of the fuel injection device according to an embodiment of the present invention, and is a longitudinal cross-sectional view showing a cut surface parallel to a center axis 100a. FIG. 2 is an enlarged cross-sectional view of an electromagnetic drive part 400 shown in FIG. 1. FIG. 3 is a view for describing an operation of a movable portion. FIG. 3(a) shows an ON/OFF state of an injection command pulse, and FIG. 3(b) shows displacement of a plunger rod 102 and a movable iron core 404 with a valve closed state of the plunger rod 102 as displacement 0.

The fuel injection device 100 is configured by a fuel supply part 200 that supplies fuel, a nozzle part 300 provided with a valve part 300a at a tip portion to permit or interrupt a flow of the fuel, and the electromagnetic drive part 400 that drives the valve part 300a. In this embodiment, an electromagnetic fuel injection device for an internal combustion engine that uses gasoline as fuel will be described as an example. Note that the fuel supply part 200, the valve part 300a, the nozzle part 300, and the electromagnetic drive part 400 indicate corresponding portions with respect to the cross section shown in FIG. 1, and do not indicate a single component.

In the fuel injection device 100 of this embodiment, the fuel supply part 200 is formed at an upper end side of the figure, the nozzle part 300 is formed at a lower end side, and the electromagnetic drive part 400 is formed between the fuel supply part 200 and the nozzle part 300. That is, the fuel supply part 200, the electromagnetic drive part 400, and the nozzle part 300 are arranged in this order along a direction of the center axis 100a.

An end portion of the fuel supply part 200 on an opposite side to the nozzle part 300 is connected to a fuel pipe (not shown). An end portion of the nozzle part 300 on an opposite side to the fuel supply part 200 is inserted into a mounting hole (insertion hole) formed in an intake pipe (not shown) or a combustion-chamber forming member (cylinder block, cylinder head, or the like) of the internal combustion engine. The electromagnetic fuel injection device 100 receives fuel supply from the fuel pipe through the fuel supply part 200, and injects fuel from the tip portion of the nozzle part 300 into the intake pipe or the combustion chamber. Inside the fuel injection device 100, from the end portion of the fuel supply part 200 to the tip portion of the nozzle part 300, a fuel passage 101 (101a to 101f) is formed such that the fuel flows substantially along the center axis 100a direction of the electromagnetic fuel injection device 100.

In the following description, for both end portions of the fuel injection device 100 in the direction along the center axis 100a, the end portion or the end portion side positioned on the opposite side to the nozzle part 300, of the fuel supply part 200, is referred to as a base end portion or a base end side, and the end portion or the end portion side positioned on the opposite side to the fuel supply part 200, of the nozzle part 300, is referred to as a tip portion or a tip side. Further, with reference to a vertical direction in FIG. 1, description is given with "upper" or "lower" added to each part forming the electromagnetic fuel injection device. This is done to make the description easy to understand, and a mounting configuration of the electromagnetic fuel injection device for the internal combustion engine is not limited to this vertical direction.

Description of Configuration

Hereinafter, configurations of the fuel supply part 200, the electromagnetic drive part 400, and the nozzle part 300 will be described in detail.

The fuel supply part 200 is configured by a fuel pipe 201. One end portion (upper end portion) of the fuel pipe 201 is provided with a fuel supply port 201a, and the fuel passage 101a is formed inside the fuel pipe 201 to penetrate in the direction along the center axis 100a. Another end portion (lower end portion) of the fuel pipe 201 is joined to one end portion (upper end portion) of a fixed iron core 401.

On an outer peripheral side of the upper end portion of the fuel pipe 201, an O-ring 202 and a backup ring 203 are provided. The O-ring 202 functions as a seal to prevent fuel leakage when the fuel supply port 201a is mounted to the fuel pipe. In addition, the backup ring 203 is for backing up the O-ring 202. The backup ring 203 may be formed by laminating a plurality of ring-shaped members. Inside the fuel supply port 201a, there is disposed a filter 204 that filters foreign matter mixed in the fuel.

The nozzle part 300 includes a nozzle body 300b, and the valve Part 300a is formed at a tip portion (lower end portion) of the nozzle body 300b. The nozzle body 300b is a hollow cylindrical body, and forms a fuel passage 101f on an upstream side of the valve part 300a. A stopper part 311 is formed in the lower fuel passage portion 101e portion of the electromagnetic drive part 400. On an outer peripheral surface of the tip portion of the nozzle body 300b, there is provided a tip seal 103 that maintains airtightness in mounting to the internal combustion engine.

The valve part 300a includes an injection-hole forming member 301, a guide member 302, and a valve element 303 provided at one end portion (lower end side tip portion) of the plunger rod 102. The injection-hole forming member 301 is configured by a valve seat 301a that is in contact with the valve element to seal the fuel, and a fuel injection hole 301b that injects the fuel. The injection-hole forming member 301 is inserted and fixed into a recess inner peripheral surface 300ba formed at the tip portion of the nozzle body 300b. Here, an outer periphery of a tip end face of the injection-hole forming member 301 and an inner periphery of a tip end face of the nozzle body 300b are welded to seal the fuel.

The guide part 302 is on an inner peripheral side of the injection-hole forming member 301, and forms a guide surface on the tip end side (lower end side) of the plunger rod 102 to guide a movement of the plunger rod 102 in the direction along center axis 100a (valve opening/closing direction).

The electromagnetic drive part 400 is configured by the fixed iron core 401, a coil 402, a housing 403, the movable iron core 404, an intermediate member 414, a plunger cap 410, a first spring member 405, a third spring member 406, and a second spring member 407. The fixed iron core 401 is also referred to as a fixed core. The movable iron core 404 is also referred to as a movable core, a movable element, or an armature.

The fixed iron core 401 has the fuel passage 101c in a center portion, and a joint part 401a with the fuel pipe 201. An outer peripheral surface 401b of the fixed iron core 401 is fitted and joined to a large diameter inner peripheral portion 300c of the nozzle body 300b, and an outer peripheral surface 401e having a larger diameter than the outer peripheral surface 401b is fitted and joined to an outer-peripheral-side fixed iron core 401d. The coil 402 is wound around an outer peripheral side of the fixed iron core 401 and a large diameter portion 300c of the cylindrical member.

The housing 403 is provided to surround an outer peripheral side of the coil 402, and forms an outer periphery of the electromagnetic fuel injection device 100. An upper-end-side inner peripheral surface 403a of the housing 403 is connected to an outer peripheral surface 401f of the outer-peripheral-side fixed iron core 401d joined to the outer peripheral surface 401e of the fixed iron core 401.

The movable iron core 404 is disposed on a lower end face 401g side of the fixed iron core 401. An upper end face 404c of the movable iron core 404 is opposed to a lower end face 401g of the fixed iron core 401 with a gap g2 in a valve closed state. The outer peripheral surface of the movable iron core 404 is opposed to the inner peripheral surface of the large diameter portion 300c of the nozzle body 300b via a slight gap, and the movable iron core 404 is provided inside the large diameter portion 300c of the cylindrical member to be movable in the direction along the center axis 100a.

A magnetic path is formed such that a magnetic flux circulates in the fixed iron core 401, the movable iron core 404, the housing 403, and the large diameter portion 300c of the cylindrical member. The movable iron core 404 is attracted in a direction of the fixed iron core 401 by a magnetic attraction force generated by the magnetic flux flowing between the lower end face 401g of the fixed iron core 401 and the upper end face 404c of the movable iron core 404.

In a center portion of the movable iron core 404, there is formed a recessed part 404b recessed from the upper end face 404c side to a lower end face 404a side. On the upper end face 404c and a bottom face of the recessed part 404b, a fuel passage hole 404d is formed as the fuel passage 101d penetrating to the lower end face 404a side in the direction along the center axis 100a. On the bottom face of the recessed part 404b, a through hole 404e penetrating to the lower end face 404a side is formed in the direction along the center axis 100a. The plunger rod 102 is provided to pass through the through hole 404e.

The plunger rod 102 is fixed with the plunger cap 410 by fitting, and has a thick diameter part 102a. The intermediate member 414 is a cylindrical member having a recessed part serving as a step on inner and outer peripheries, in which an inner peripheral surface 414a abuts against an upper face 102b of the plunger rod thick diameter part 102a, and an outer peripheral surface 414b abuts against the bottom face 404b' of the recess part of the movable iron core. Between a lower face 102c of the thick diameter part and the bottom face 404b' of the movable iron core recessed part 404b, a gap g1 (pre-stroke gap) is provided. A length obtained by subtracting height h between the upper face 102b and the lower face 102c of the plunger rod thick diameter part from height 414h of the recessed part step of the intermediate member 414 is the gap g1 described above. Below the movable iron core 404, there is formed the stopper part 311 that is a part of the nozzle body 300b and extends from the outer peripheral side of the nozzle body 300b to the inner peripheral side to an inner peripheral side cavity, to a diameter portion 311a. In the valve closed state, there is a gap g3 between a lower face 404a of the movable iron core 404 and the stopper part 311.

An upper end portion of the first spring member 405 abuts against a lower end face of a spring force adjusting member 106, and a lower end portion of the first spring member 405 abuts against an upper spring bearing 410a of the plunger cap 410, to energize the plunger rod 102 downward via the plunger cap 410. An upper end portion of the third spring member 406 abuts against a lower spring bearing part 410b of the plunger cap 410, and a lower end portion of the third spring member 406 abuts against an upper face 414c of the intermediate member 414, to energize the intermediate member 414 downward. An upper end portion of the second spring 407 abuts against the lower face 404a of the movable iron core 404, and a lower end portion of the second spring 407 abuts against a stepped portion 300d of the nozzle body 300b, to energize the movable iron core 404 upward.

The coil 402 is wound on a bobbin and assembled to the outer peripheral side of the fixed iron core 401 and the large diameter portion 300b of the cylindrical member, and a resin material is molded around the coil 402. By a resin material used for this molding, a connector 105 having a terminal 104 drawn out from the coil 402 is integrally molded.

Description of Operation

Next, an operation of the fuel injection device 100 in this embodiment and features of this embodiment will be described. Description is given mainly with reference to FIG. 2, which is an enlarged view of the electromagnetic drive part 400, and FIG. 3, which describes an operation of the movable portion.

Definition of Valve Closed State, Description of Gap

In a valve closed state where the coil 402 is not energized, the plunger rod 102 abuts against the valve seat 301a to close the valve, by a force obtained by subtracting an energizing force of the third spring member 406, from an energizing force of the first spring member 405 energizing the plunger rod 102 in the valve closing direction and the second spring member 407. This state is called a valve-closed stationary state. Here, the movable iron core 404 abuts against an outer peripheral stepped portion 414b of the intermediate member 414, and is disposed in a valve closing position. In the valve closed state of the fuel injection device of this embodiment, gaps associated with a movable part relating to a valve opening operation are configured as follows.

Between the upper end face 404c of the movable iron core 404 and the lower end face 401g of the fixed iron core 401, a gap g2 is provided. Between a flat surface 404b' of the recessed part 404b of the movable iron core 404 and the lower face 102c of the plunger rod thick diameter part, the gap g1 is provided. A relationship between g1 and g2 is g2>g1.

In the valve closed state, there is the gap g3 between the lower face 404a of the movable iron core 404 and the stopper part 311. The gap g3 is set such that only the movable iron core 404 collide with the stopper part 311 when being displaced downward after the opening and closing valve operation of the plunger rod 102.

Namely, the solenoid valve (fuel injection device) of this embodiment includes the valve element 303 that abuts against and separates from the valve seat 301a to seal the fuel, the movable iron core 404 capable of being separated from the valve element 303, and the fixed iron core 401 arranged opposed to the movable iron core 404. There are also provided the first spring member 405 that energizes the valve element 303 toward a side of the valve seat 301a, the second spring member 407 that energizes the movable iron core 404 toward the fixed iron core 401, and the stopper part 311 disposed on the side of the valve seat 301a with respect to the movable iron core 404, and disposed with the movable iron core 404 via the valve-closed-state gap g3 in a displacement direction in the valve closed state. Additionally, the valve-closed-state gap g3 is set such that the movable iron core 404 collides with the stopper part 311 when being displaced in the valve closing direction after opening of the valve element 303.

Namely, the solenoid valve of this embodiment is arranged with the valve element 303 via the pre-stroke gap g1 in an axial direction in the valve closed state, and provided with the movable iron core 404 that moves in the valve opening direction to axially contact with the valve element 303, and the stopper part 311 disposed on a side of a valve seat part (valve seat 301a) with respect to the movable iron core 404, and arranged in an axial direction with the movable iron core 404 via the valve-closed-state gap g3 in the valve closed state. This valve-closed-state gap g3 is set such that the movable iron core 404 collides with the stopper part 311 when returning to the valve closing direction after valve opening, in the solenoid valve.

Operation after Energization

After energization to the coil 402 (P1), a magnetomotive force is generated by the electromagnet formed by the fixed iron core 401, the coil 402, and the housing 403. This magnetomotive force causes a flow of a magnetic flux that is formed to surround the coil 402, and circulates the magnetic path formed by the fixed iron core 401, the housing 403, the thick diameter part 300d of the nozzle body, and the movable iron core 404. Here, a magnetic attractive force acts between the upper end face 404c of the movable iron core 404 and the lower end face 401g of the fixed iron core 401, and the movable iron core 404 and the intermediate member 414 are displaced toward the fixed iron core 401. Then, the movable iron core 404 is displaced by g1 (404D1) until abutting against the lower face 102c of the thick diameter part of the plunger rod. Here, the plunger rod 102 does not move (102D1).

Then, when the movable iron core 404 abuts against the lower face 102c of the thick diameter part of the plunger rod at timing t1, the plunger rod 102 receives an impact force from the movable iron core 404 and is lifted, and the plunger rod 102 is separated from the valve seat 301a. This causes a gap to be formed in the valve seat part, to open the fuel passage. Since the valve is opened by receiving the impact force, the plunger rod 102 rises sharply (3A).

After that, when the plunger rod 102 is displaced by g2-g1, and an upper face 404c of the movable iron core 404 abuts against a lower face 401g of the fixed iron core 401 at timing t2, the plunger rod 102 is displaced upward (3B), the movable iron core 404 is displaced downward (3B'). Then, the plunger rod 102 and the movable iron core 404 come into contact with each other again (3C) and then separate from each other again, the plunger rod is displaced upward (3D), the movable iron core 404 is displaced downward (3D'), and then the displacement is stabilized at g2-g1 (3E).

Action and Effect

In this embodiment, the intermediate member 414 is provided below the third spring 406 that applies a spring force to the movable iron core 404 and the plunger rod 102, and disposed to abut against the surface 404b' of the recessed part of the movable iron core 404, and the upper face 102b of the thick diameter part of the plunger rod 102. Accordingly, the movable iron core 404, the plunger rod 102, and the intermediate member 414 perform the valve opening operation, and when the movable iron core 404 and the fixed iron core 401 collide with each other at timing t2, the movable iron core 404 moves downward, but the intermediate member 414 and the plunger rod 102 continue to move upward.

In this state, no spring force acting between the movable iron core 404 and the plunger rod 102 is generated, and the spring force is separated. Therefore, the spring force that changes according to the movement of the movable iron core 404 is not transmitted to the plunger rod 102, on the contrary, there is no possibility of transmitting a spring force that changes with the movement of the plunger rod 102 to the movable iron core 404, causing each other's independent oscillation along with the collision (3B, 3B'). Further, in an additional collision (3C), while the movable iron core 404 bounds downward (3D') and the plunger rod 102 bounds upward (3D) again, the movable iron core 404 and the plunger rod 102 do not transmit or receive the force, but move without applying a spring force that changes along with the each other's movement, and the force of the plunger rod 102 and the movable iron core 404 is small. Therefore, the convergence of the bounding of the movable part becomes faster (3E) than that in a case where a spring force that changes along with the each other's movement is applied. This effect enables stabilization of the fuel injection amount.

Further, in the valve closed state, the gap g1 in which the movable element 404 is displaced is defined by a difference between height 414h of the recessed part of the intermediate member 414 and height h of the plunger rod thick diameter part (height h between the upper face 102b and the lower face 102c of 102a), which is determined by dimensions of parts, eliminating necessity of adjustment in assembling process, and enabling simple assembly process.

When the energization to the coil 402 is interrupted (P2) at timing t3, the magnetic force starts to disappear, and the valve closing operation is performed by an energizing force of the spring in a downward direction. After the displacement of the plunger rod 102 becomes zero at timing t4, the plunger rod abuts against the valve seat 301a to complete the valve closing (102D2).

After moving to the initial position g1 (404D2) after the valve closing, the movable iron core 404 is further displaced downward and collides with the stopper part 311 at a position of g3+g1. This collision reduces kinetic energy possessed during the downward movement after the valve closing to decrease the speed, and the movable iron core 404 bounds and stops at the position g1 (404D3). Since this action prevents a state where the gap g1 is shortened, improving the stability of the valve opening operation. Namely, using a valve-opened-state gap g3 enables energy dissipation by the collision or a squeeze effect when the movable iron core 404 approaches the stopper part 311. This allows the pre-stroke gap g1 to be secured, enabling injection even at short pulse intervals.

In the valve closed state, there is the gap g3 between the lower face 404a of the movable iron core 404 and the stopper part 311. Therefore, when the movable iron core 404 collides with the stopper part 311 during the downward movement after the opening/closing valve operation, the gap of the flat surface 404b' of the recessed part 404b of the movable iron core 404 and the lower face 102c of the plunger rod thick diameter part is larger than the gap g1 in the valve closed state. Consequently, it is possible to dissipate the kinetic energy that has been possessed during the downward displacement before returning to the position of g1, and to stop at the position of g1. This prevents the gap g1 from being shortened, improving the stability of the valve opening operation.

In the absence of the stopper part 311, as indicated by 404D4, the movable iron core 404 continues the downward displacement and returns to the g1 with speed, and is displaced upward without stopping at g1, causing a state where the gap, of the movable iron core 404 and the plunger rod 102, is small in the displacement direction in the valve closed state.

The inventors of the present invention have found that the gap g3 between the lower face 404a of the movable iron core 404 and the stopper part 311 needs to be equal to or smaller than expression 1 in the valve closed state. Symbols in the formula are the following physical quantities. In the valve closed state, the downward energizing force of the first spring member 405 is Fssp, the downward energizing force of the third spring member 406 is Fmsp, the upward energizing force of the second spring member 407 is Fzsp, sum of the spring forces acting on the movable iron core 404, the plunger rod 102, and the intermediate member 414 in the valve closed state is F with the downward direction defined as positive, mass of the plunger rod 102 is mp, mass of the intermediate member 414 is ms, mass of the movable iron core 404 is ma, and total mass of the movable part is M. Note that g1 and g2 have the following relationship as described above. The gap g1 is between the flat surface 404b' of the recessed part 404b of the movable iron core 404 and the lower face 102c of the plunger rod thick diameter part, and the gap g2 is between the upper end face 404c of the movable iron core 404 and the lower end face 401g of the fixed iron core 401.

$$g3 < F/M * ma/Fzsp * (g2-g1) - g1 \qquad (1)$$

Namely, setting g3 to be shorter than a downward displacement length of the movable iron core 404 after the valve closing causes the movable iron core 404 to collide with the stopper part 311, and reduces the kinetic energy possessed during the downward displacement after valve closing to decrease the speed, enabling the movable iron core 404 to bound at the stopper part 311 and stop at the position g1. Since this action prevents a state where the gap g1 is shortened, improving the stability of the valve opening operation.

The present inventors have further found that, in the configuration of this embodiment, a horizontal cross-sectional area of an opposing surface, in the stopper part 311, opposed to the lower face 404a of the movable iron core 404 is preferably 25 to 60% of a horizontal cross-sectional area of the lower face 404a of the movable iron core 404.

Figure 5:
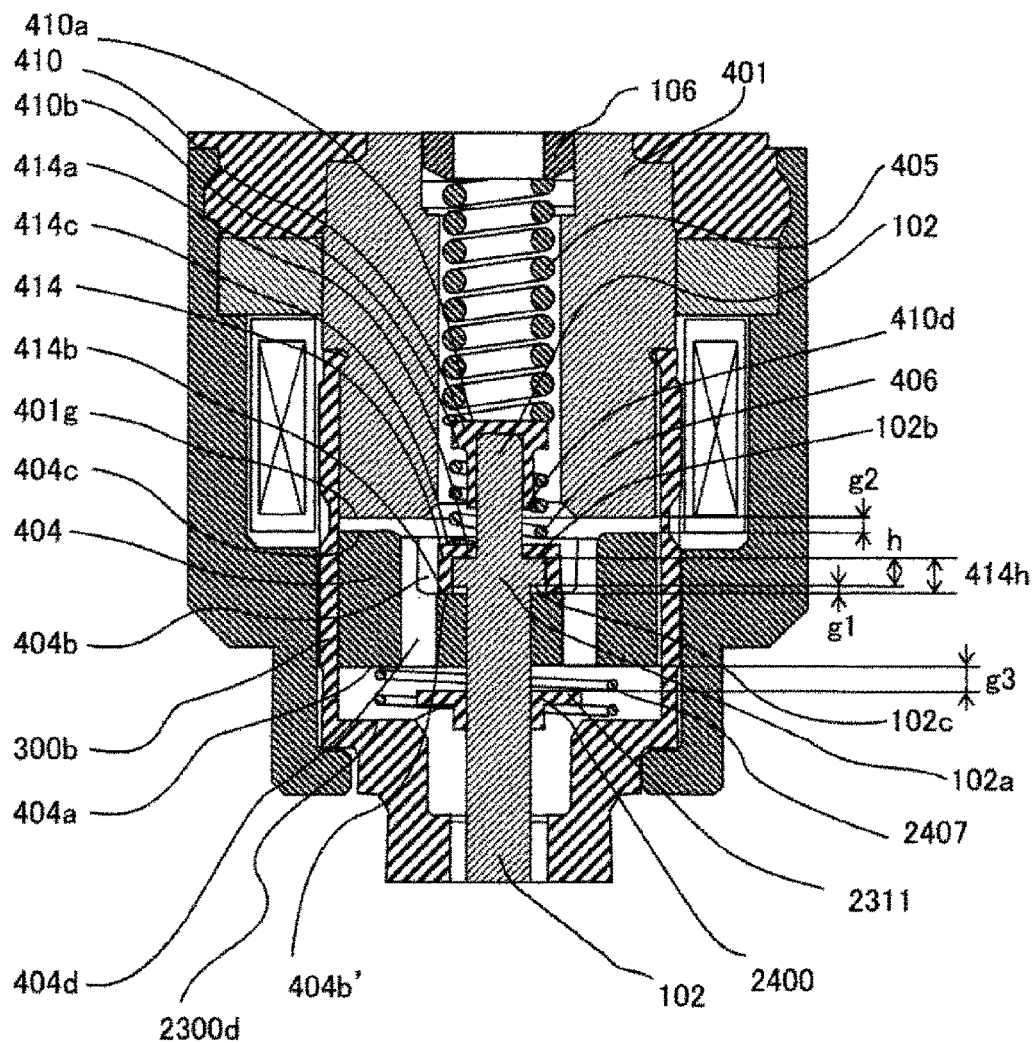
FIG. 5 is a cross-sectional view showing a structure of a fuel injection device according to a second embodiment of the present invention, and is an enlarged cross-sectional view showing an electromagnetic drive part of the fuel injection device.

In FIG. 5, a horizontal axis indicates a ratio of an area of the stopper part 311 to the lower face 404a of the movable iron core 404, and a vertical axis indicates a speed reduction rate of the movable iron core 404 as 1400, with respect to a speed at a start of downward displacement after valve closing. As the cross-sectional area of the stopper part 311 becomes larger than the cross-sectional area of the lower face 404a of the movable iron core 404, an effect of the fluid damper acts in the collision to decrease the speed. In a state where the speed is decreased, the movable iron core 404 collides with the stopper part 311, and returns to g1, which is the valve-closed standby state. This prevents the prestroke gap g1 from being shortened in the valve closed state of the movable iron core 404 and the valve element 102, improving the stability of the valve opening operation.

Additionally, in the configuration of this embodiment, by integrally forming the stopper part 311 with the nozzle body 300b including the movable iron core 404 and the valve element 303 from the outer peripheral direction toward the inner peripheral direction, it is possible to determine the valve-closed-state gap g3 of the movable iron core 404 and the stopper part 311 in the valve closed state by processing of the nozzle body 300b, enabling improvement of performance with a simple method without adding parts or the like.

Moreover, in the configuration of this embodiment, the outer diameter 414D of the intermediate member is made smaller than the inner diameter 401D of the fixed iron core. Accordingly, in assembling the fuel injection device, after the gap g1 is determined by the step height 414h of the intermediate member and height h of the plunger rod thick diameter part, the plunger cap 410, the plunger rod 102, the third spring member 406, and the intermediate member 414 can be integrally incorporated into the fuel injection device in advance in a state where the spring force adjusting member 106 and the first spring member 405 are not inserted, enabling stable management of the gap g1 while simplifying the assembly. In this embodiment, a thick diameter part 414D of the intermediate member 414 is made smaller than the inner diameter 401D of the fixed iron core 401. However, it is only necessary that an outermost diameter of a member to be assembled in advance is small, and when an outermost diameter of the plunger cap 410 is larger than an outermost diameter 414D of the intermediate member, the outermost diameter of the plunger cap 410 may be made smaller than the inner diameter 401D of the fixed iron core 401.

In this embodiment, even if the recessed part 404b of movable iron core does not exist but is the same surface as 404c, it is possible to obtain the same operation effect as this embodiment. This is because providing the recessed part 404b of the movable iron core allows the intermediate member 414 to be arranged further downward, a vertical length of the plunger rod 102 to be shortened, and the plunger rod 102 to be configured with high accuracy.

Note that the present invention is not limited to the above embodiments, and various modifications may be included. For example, the embodiments described above have been illustrated in detail to facilitate description for easy understanding, and are not necessarily limited to the embodiments that include all the configurations. Additionally, a part of a configuration of an embodiment may be replaced with a configuration of another embodiment, and a configuration of an embodiment may be added with a configuration of another embodiment. Moreover, a part of a configuration of each embodiment may be deleted, replaced, added with another configuration.

Second Embodiment

A second embodiment of the present invention will be described with reference to FIG. 5. In the figure, explanation of the components having same numerals as those of the first embodiment is omitted since there is no difference in the configuration and effect.

A difference from the first embodiment is that a stopper member 2400 is joined to a plunger rod 102, and the stopper part 2400 is formed from an inner peripheral side to an outer peripheral side. In addition, a lower face 404a of a movable iron core 404 collides with an upper face 2311 of the stopper part 2400. Further, a second spring member 2407 energizing the movable iron core 404 upward has an indicated position supported by a flat surface portion 2300d provided on the nozzle body 300b, and energizes the movable iron core 404 upward.

Due to the configuration of this embodiment, a position of the stopper member 2400 that collides with the movable iron core 404 can be determined in an adjustment process of component assembly, allowing relaxing of requirement of accuracy to an individual component to simplify the component.

According to the present invention as well, after the opening/closing valve operation, only the movable iron core 404 collides with the stopper part 2400 during downward displacement. This collision reduces the kinetic energy possessed during the downward movement after the valve closing to decrease the speed, and the movable iron core 404 stops at the position g1, which prevents the pre-stroke gap g1 from being shortened in valve closing, enabling improvement of stability of an injection amount.

REFERENCE SIGNS LIST 100 fuel injection device
101 fuel passage
102 plunger rod
200 fuel supply part
300 nozzle part
301a valve seat
301b fuel injection hole
311 stopper part
400 electromagnetic drive part
401 fixed iron core
402 coil
403 housing
404 movable iron core
405 first spring member
406 third spring member
407 second spring member
414 intermediate member

The invention claimed is:

1. A solenoid valve provided with a valve element that abuts against and separates from a valve seat to seal fuel, a movable iron core capable of being separated from the valve element, and a fixed iron core arranged opposed to the movable iron core, the solenoid valve comprising:
   a first spring member that energizes the valve element toward a side of the valve seat;
   a second spring member that energizes the movable iron core toward the fixed iron core; and
   a stopper part disposed on the side of the valve seat with respect to the movable iron core, and arranged with the movable iron core via a gap in a displacement direction in a valve closed state, wherein
   the gap is set such that the movable iron core collides with the stopper part when being displaced in the valve closing direction after the valve element is opened, and wherein
   an area of an opposing surface, in the stopper part, opposed to a lower face of the movable iron core is 25 to 60% of an area of the lower face of the movable iron core in a horizontal direction.

2. A solenoid valve comprising:
   a movable iron core that is arranged with a valve element via a pre-stroke gap in an axial direction in a valve closed state, and moves in a valve opening direction to axially contact with the valve element; and
   a stopper part arranged on a side of a valve seat with respect to the movable iron core, and arranged with the movable iron core via a gap in an axial direction in a valve closed state.

3. The solenoid valve according to claim 2, wherein
the gap is set such that the movable iron core collides with the stopper part when returning to the valve closing direction after valve opening.

4. The solenoid valve according to claim 1, wherein
a pre-stroke gap is formed between the valve element and the movable iron core in a displacement direction in the valve closed state.

5. The solenoid valve according to claim 1, wherein
when the gap is defined as g3, a direction toward the side of the valve seat is defined as positive, a total of an energizing force acting on a movable member is F, an upward energizing force of the second spring member is Fzsp, total mass of the movable member is M, mass of the movable iron core is ma, a gap of the movable iron core and the fixed iron core in a valve closed state in a displacement direction is g2, and a gap of the valve element and the movable iron core in a valve closed state in a displacement direction is g1, $$g3 < F/M * ma/Fzsp * (g2-g1) - g1 \qquad (1).$$

6. The solenoid valve according to claim 1, wherein
the stopper part is joined to the fixed iron core, and is integrally formed with a nozzle holder containing the movable iron core and the valve element, from an outer peripheral direction to an inner peripheral direction.

7. The solenoid valve according to claim 1, wherein
the stopper part is integrally formed with the valve element, from an inner peripheral direction to an outer peripheral direction.

8. The solenoid valve according to claim 2, wherein an area of an opposing surface, in the stopper part, opposed to the movable iron core is 25 to 60% of an area of the movable iron core in a horizontal direction.

9. The solenoid valve according to claim 1, wherein
the opposing surface in the stopper part is directly opposed to the lower face of the movable iron core.

10. A solenoid valve provided with a valve element that abuts against and separates from a valve seat to seal fuel, a movable iron core capable of being separated from the valve element, and a fixed iron core arranged opposed to the movable iron core, the solenoid valve comprising:
   a first spring member that energizes the valve element toward a side of the valve seat;
   a second spring member that energizes the movable iron core toward the fixed iron core; and
   a stopper part disposed on the side of the valve seat with respect to the movable iron core, and arranged with the movable iron core via a gap in a displacement direction in a valve closed state, wherein
   the gap is set such that the movable iron core collides with the stopper part when being displaced in the valve closing direction after the valve element is opened,
   wherein an area of an opposing surface, in the stopper part, opposed to a lower face of the movable iron core is 25 to 60% of an area of the lower face of the movable iron core in a horizontal direction,
   wherein the opposing surface in the stopper part is directly opposed to the lower face of the movable iron core, and
   wherein in the valve closed state, the gap is defined by a difference between a height of a recessed part of the intermediate member and a height of a plunger rod thick diameter part.

* * * * *